Figure 1:
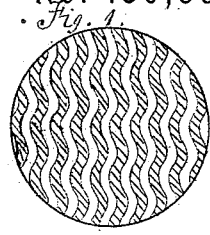

4 Sheets--Sheet 1.
W. HAGGETT.
Improvement in Treating Iron and other Materials to give Greater Strength for Buildings, &c.
No. 130,992.  Patented Sep. 3, 1872.

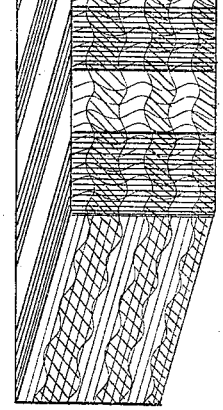

Witnesses.
J. W. Wynne
Dan Forshaw
Inventor
William Haggett

W. HAGGETT.
Improvement in Treating Iron and other Materials to give Greater Strength for Buildings, &c.
No. 130,992.  Patented Sep. 3, 1872.
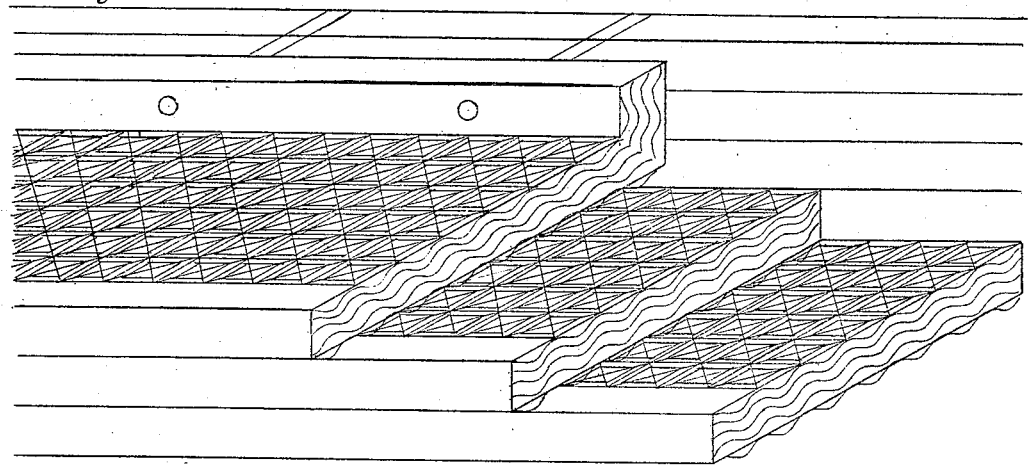
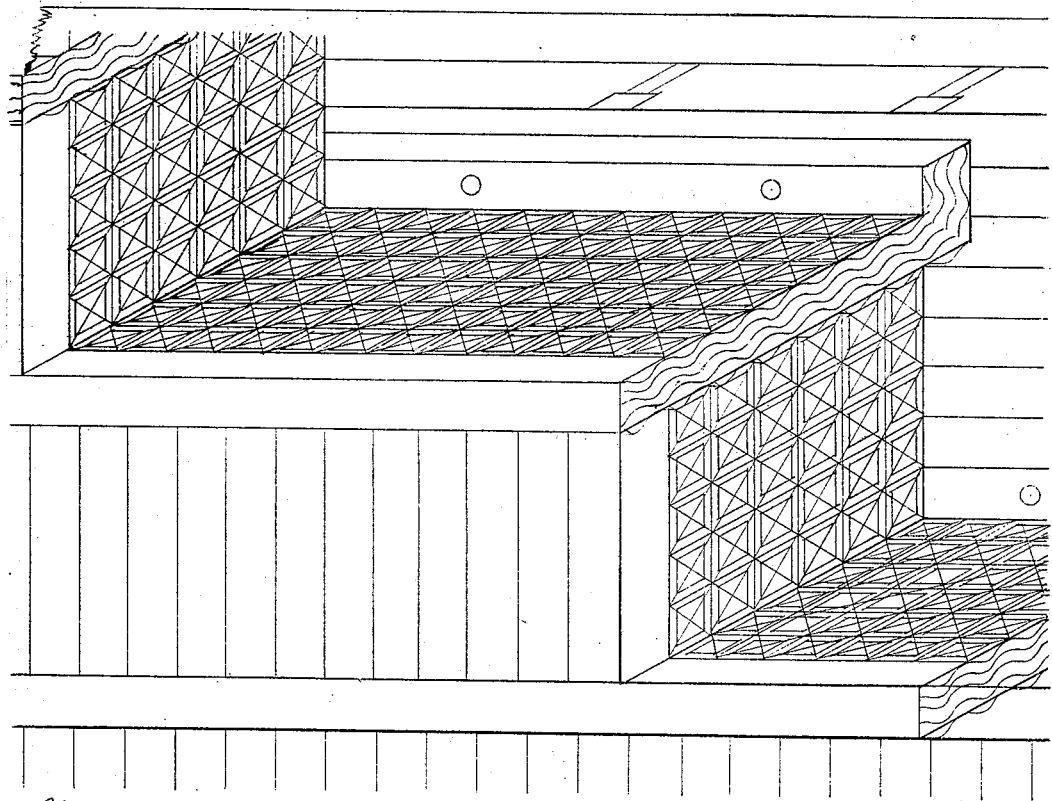
Witnesses
Inventor
William Haggett

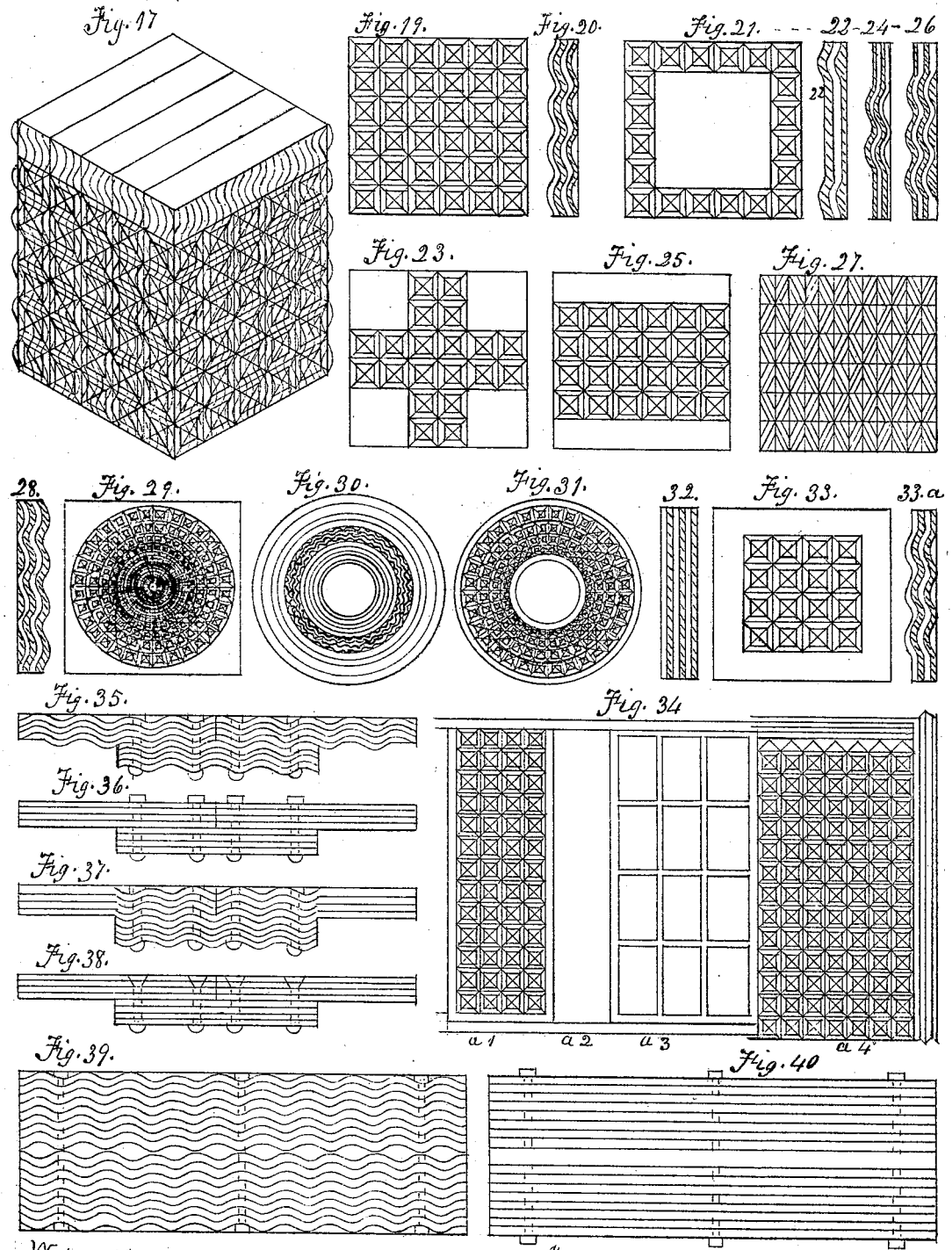

W. HAGGETT.

Improvement in Treating Iron and other Materials to give Greater Strength for Buildings, &c.

No. 130,992.  
Patented Sep. 3, 1872.

4 Sheets--Sheet 4.

Witnesses  
Inventor  
William Haggett

UNITED STATES PATENT OFFICE.

WILLIAM HAGGETT, OF WATFORD, ENGLAND.

IMPROVEMENT IN TREATING IRON AND OTHER MATERIALS TO GIVE GREATER STRENGTH FOR BUILDINGS, &c.

Specification forming part of Letters Patent No. 130,992, dated September 3, 1872.

Specification describing certain improvements in forms, and in the method of manufacturing, treating, arranging, combining, and compressing the fibers and substances composing most of the present metals, glass, brick, tiles, artificial stone, wood, and pulp used in building for civil, military, and naval purposes, including ordnance, armor-plating for ships and forts; also for lighting, heating, and ventilation, invented by WILLIAM HAGGETT, of Watford, county of Herts, England.

Beginning with plain plates or sheets of the various kinds and qualities of the metals of commerce, the first part of my invention consists in giving to such plain plates compound undulated forms, the undulations crossing each other at right angles or obliquely in opposite directions, or radially and circular. These undulated forms impart to the plates great lateral strength and rigidity, and, as they extend in all directions, they also insure equal compensation for contraction and expansion in the same directions, a desideratum of great practical importance; for each plate, having in its compound or transverse undulated form the requisite compensation for its own contraction and expansion in all directions, it is thereby made practical, as it is often desirable to attach its borders firmly to unyielding parts of a structure. Sky-lights, roof-covering, and panels afford familiar illustrations in point. These require close and firm connections along their borders, or to the frames in which they may be inserted.

These forms will greatly extend the applicability of glass to building purposes, and increase its strength and value for sky-lights, and for illuminating panels for doors, transoms, and ceilings. An important incidental advantage of this undulated form of lights, which, however, I do not claim as my invention, is its increased power or capacity for illumination, and for diffusion of light, over that of lights having plain surfaces.

As to the effects of contraction and expansion referred to, arising from changes of temperature, take, for illustration, a panel that has its borders immovably fixed, increase of heat would tend to expand the panel in all directions; but, as its borders cannot move, the expansion is taken up in the readily-yielding fold-like form of the undulations, which are thereby made slightly deeper, while increased cold will have a contrary effect, and slightly flatten the folds. Now, as these changes act equally in transverse and longitudinal directions, the reason why the undulations should be made compound and extend in the same directions becomes obvious. Simple corrugations in one direction supply this compensation in the transverse direction only, and not at all in the direction of their length.

The process for undulating the plates will be varied to suit the character of the material operated upon. Some by direct casting in matrices of the desired form; others by being heated and pressed between rollers, stamps, dies, or any other devices of like character; or pressed into a matrix or mold while the substance is cold and pliable, and left to be seasoned, or to be heated or baked. But in all cases must the opposite impressing faces of the rollers, stamps, dies, molds, or matrices for shaping the undulations be formed conversely in pairs, and so adjusted that the alternate concave and convex parts shall accurately fit, work, and press into each other. Each kind of metal, and all the other substances thus formed, should be subjected to such pressure, heat, or other process as their respective characters may require to bring them to the highest attainable degree of perfection as to quality, texture, and strength. Such of the plates as may be cast in the undulated forms of molten material, or formed of plain plates, heated and pressed into the forms desired, their thickness being uniform, as considerations of economy and utility require they should be, will, on account of their uniform thickness, also cool and contract equally throughout. Thus the inevitable damaging effects of unequal cooling in plates of unequal thickness will be avoided. This is an object of great practical importance, the attainment of which is not possible in the manufacture of heated material into plates of unequal thickness. But, having the thickness uniform, they will cool evenly. There will be no strain. The texture of the material will be natural and the strength of the plates uniform and perfect throughout. Being thus free from all inherent strains, and so formed, as before described, as not to become unequally strained by the changes of temperature that may occur in use, the plates will at all times and under all circumstances, possess the normal strength due to the material of which they are composed. The second part of my invention consists in combining several plates thus undulated and compressed into one of greater thickness; and still further improved in quality by so incorporating the qualities of the metals composing the several plates, and interlocking and knitting them together, as to impart to the whole a firm textile character, combining great power of cohesion and of resistance, not liable to split in any direction, nor under any circumstances become laminated by use—qualities of the highest importance in the construction of railways, fortifications, armor for ships of war, and for other purposes of like character.

The process consists in so fagoting up the undulated plates that the longitudinal and transverse undulations and fibers of successive layers shall alternately cross each other. The undulations being in all respects symmetrical, as well as compound in both forms and directions, they will fit and pack into each other as well transversely as longitudinally. In this transversely-packed form the fagot is heated to a proper degree for welding, placed within a compartment or mold of proper form that shall have sufficient strength to prevent spreading when pressure or any other adequate power or force may be applied to insure perfect adhesion between the several layers by welding, and as much more power should be applied as may be required to compress the mass to a proper degree of density. The quality of most of the metals will be materially improved by this process. But it is most important in its application to fibrous metals, as by the undulations of the plates, and of the fibers as well, in transverse directions, and being thus interlocked, knit, firmly welded, and powerfully compressed, the combinations become admirably suited to the purposes named. The mass, blocks, or plates thus built up of several plates will, when practicable, be at once shaped, with reference to their use in the form thus imparted to them. But they can, of course, afterward be rolled, pressed, or forged to any other dimensions and forms that may be required without materially changing the textile, knit, or felted character of the combination.

In fagoting, plates of different qualities of metal may be arranged and intermixed as considerations of utility or economy may dictate. In most cases a better quality will be required for the exterior than for the interior of heavy plates or blocks.

In an economical point of view, as regards strength and lateral rigidity of the compound undulated plates, when used as for panels in ornamental ceilings, instead of the plain form used for this purpose in the ceilings of the Senate and Hall of Representatives of the United States, the saving of the first over the latter would be full three-fourths in weight in material, and, all things considered, quite as much in cost—amounting to about one hundred thousand pounds. It would also relieve the roofs of so much of the weight now sustained by them. And the undulated form is in itself becomingly ornamental for panels generally. That metal, having its fibers thus closely interlocked, and as it were, knit and closely felted together, as described, would greatly improve its quality for railway purposes appears too plain to require argument. It is quite obvious that rails thus formed could neither split nor laminate by use, that their sizes might be considerably reduced, and that they would wear very much longer than those formed in the usual way. Its superiority for ordnance and armor platings is equally obvious.

Most rolling-mills and many other iron establishments have all the power required for carrying on this system of manufacturing metals. They would only require a supply of properly-formed rollers, dies, &c., for this purpose, most of which can be furnished or prepared at comparative little cost.

In the drawing, I have shown the bars and plates of undulated metals in contrast with the present, so that the improvement may be the better seen, and although some of the figures are line-shaded to show the difference in qualities and extra compression of iron and steel, yet it must be understood that they represent all descriptions of metal and material intended to be manufactured of these forms.

Figure 3:
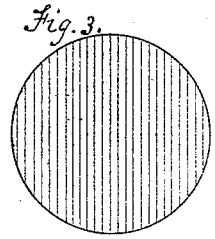
Figure 5:
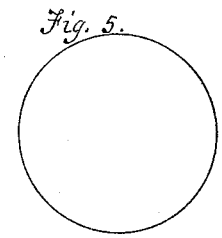
Figure 13:
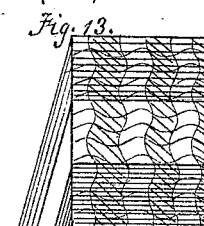
Figure 2:
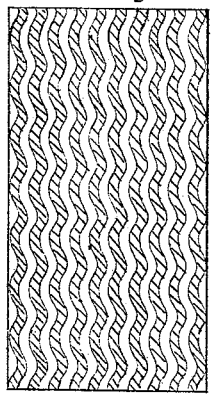
Figure 4:
Figure 6:
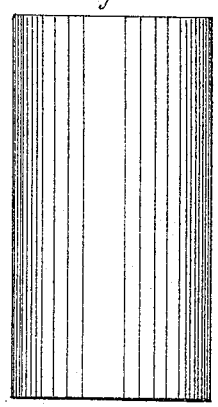
Figure 7:
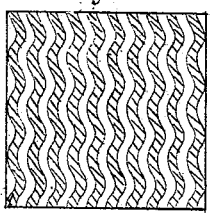
Figure 9:
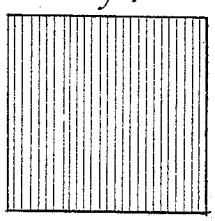
Figure 11:
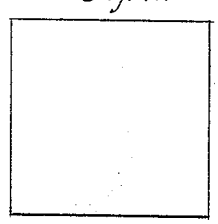
Figure 14:
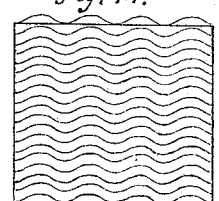
Figure 8:
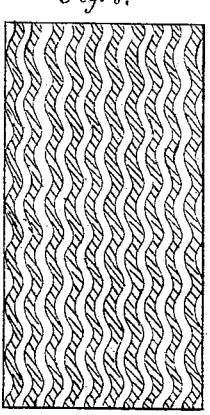
Figure 10:
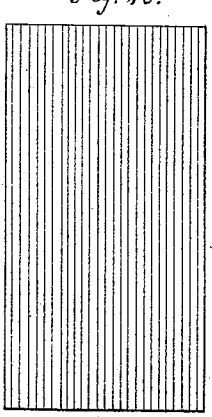
Figure 12:
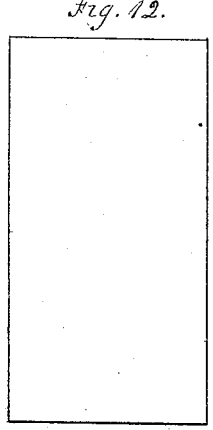
Figure 15:
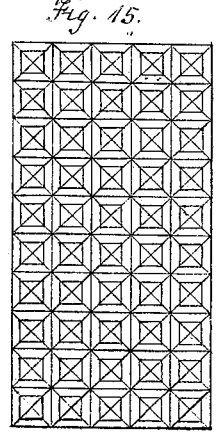
Figure 41:
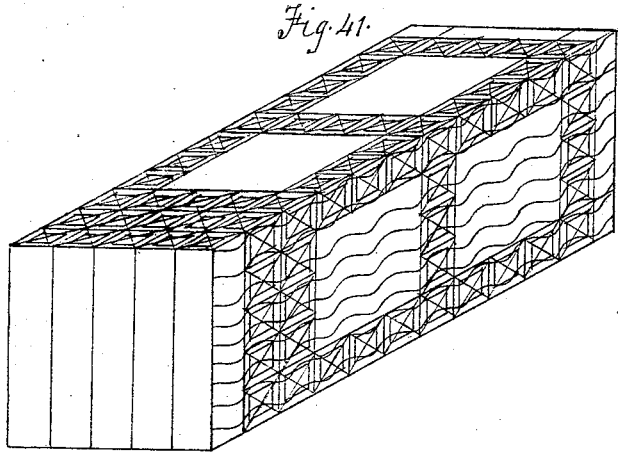
Figure 45:
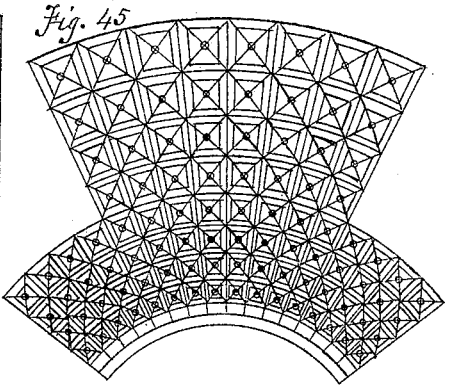
Figure 42:
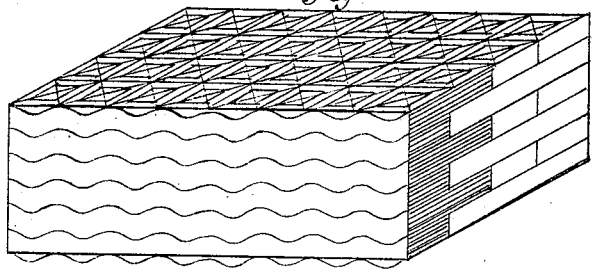
Figure 46:
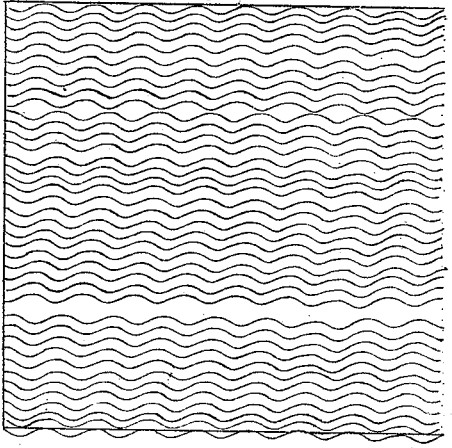
Figure 43:
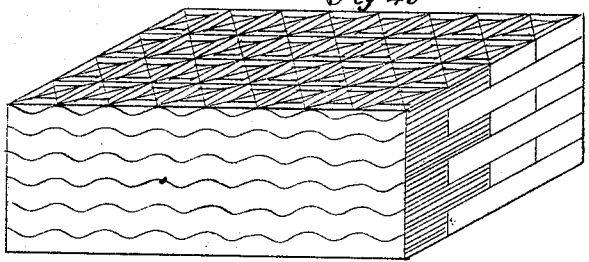
Figure 44:
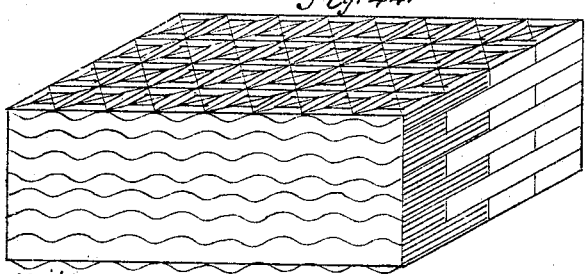
Figure 47:
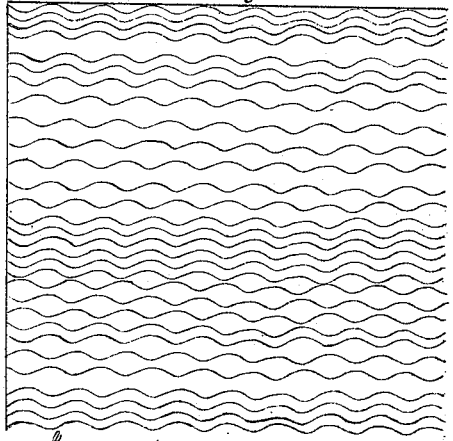

Figures 1 and 2 represent cross and longitudinal sections, showing the preparation and fagoting up of a large round bar of iron or steel with the undulated fibers, the line-shading showing the difference in quality and extra compression to be used separately, or welded and combined. The quality should be in all cases denoted by a brand on the finished metal. Figs. 3 and 4, cross and longitudinal sections showing the fagoting up of a similar round bar with straight fibers, as at present. Figs. 5 and 6 show that when the undulated is finished with plain surfaces it will appear the same as the present metals with straight fibers. Figs. 7 and 8, cross and longitudinal sections showing the faggoting up of square bars or plates of any dimensions with undulated fibers. Figs. 9 and 10, cross and longitudinal sections of similar bars or plates with straight fibers. Figs. 11 and 12 show that the external appearance of undulated and straight fibered bars and plates is the same, and need a brand by which to distinguish their quality or character. Fig. 13 is an illustration of a plate of the undulated metal finished with plain exterior, but of intermixed metals, and may be made in blocks, so as to interlock into each other, as denoted by the different shading, and so as to work in with other undulated metals and materials. Fig. 14, cross-section of bars or plates of any dimensions, finished with two plain and two undulated surfaces and square ends, to be used separately or in combination. Fig. 15 is a front view of the preceding bar or plate, showing the undulations longitudinally and transversely. Fig. 16, view of bars or plates as used separately or in combination, showing the longitudinal and transverse undulations on nearly the whole of two sides, a portion being left plain, with plain edges and ends, as intended to be done in all other cases where required for extra compression or shaping, capable of being built upon each other, as there shown, so as to expose only such prepared and compressed edges, the fibers being also, where required, arranged end on, to give greater resistance, the whole secured by the undulated angle-plates bolted to the back, by which arrangement the whole will be securely fixed without any bolts being exposed or liable to injury; or, if preferred, these rows or courses of plates for fixing may be wider and built up with or let into the woodwork. Thin sheets of gutta-percha, India rubber, or other yielding substances of like character may be placed between such joints for making them water-proof. Fig. 17 represents a portion of armor-plating composed of undulated blocks, with the fibers arranged end on or otherwise, separately or in combination, the longitudinal and transverse undulations on the four sides being so prepared as to be interlocked into each other and into the angle-plates, so that they may be easily built upon prepared bases and fixed securely at any time to ships, forts, shields, and other works when required, as before described. Fig. 18 illustrates the manner of building up the last-mentioned plates or blocks of iron or steel with other material. These may be made portable, to be attached at any time to timber backing of any kind. Fig. 19, plan showing longitudinal and transverse undulations extending over the whole surface of a plate. Fig. 20, section of Fig. 19, showing the form of the undulations and fibers in both directions, the line shading denoting the difference in quality; to be separately compressed and welded, or used in separate sheets, which may, when desired for ventilation, heating, or other purposes, be perforated at the apexes of the undulations. Figs. 21 and 22, plan and section showing how the plates may be undulated around the edges only, in case they should be desired in this form for special purposes. Figs. 23 and 24, plan and section representing a plate with only its central part undulated transversely, which may also be required for special purposes. Figs. 25 and 26, plan and section of undulated bars and plates with two edges left plain, when desired in this form, for riveting or for any other special purpose. Figs. 27 and 28, plan and section representing diagonal or oblique undulations crossing each other at equal angles in opposite directions; a good form for roof-covering, either metallic, tile, or glass for skylights. Fig. 29, circular and radiated form of undulations, also suitable for glass and pottery, as well as for metal and other substances, it being ornamental as well as useful. They may also be made oval, or of any other ornamental form, and perforated for purposes of heating and ventilation. Made of strong metal they would form safe heads for steam-boilers. Fig. 30, illustration of undulated coils rolled up to any thickness desired for steam-cylinders, ordnance, and other purposes in which great strength may be required. Figs. 31 and 32 represent coils or plates of various sizes and thicknesses, with circular and radiated undulations, built up or welded, or fitted over each other, for ordnance and other purposes. Figs. 33 and $33^d$, plan and section of undulated panels of any description of metal, with straight edges to fit into grooves. Panels of like undulations may be formed of glass and answer admirably for transom and door lights, and for ceilings, domes, and skylights; though for the latter the form represented in Fig. 27 would be more suitable. Fig. 34, plan of a roof and its covering, applicable to portable and other buildings. On account of the lightness of the undulated coverings, whether formed of metals, glass, pottery, or other materials, the sizes of the timbers or iron used in forming the frame-work of the building may be much reduced; and by using the metal and other fittings within, as at $A^1$, adding felt marked $A^2$ over this on the rafters wood-raps, as at $A^3$, and then covering with the undulated plates composed of any suitable material, the roof will be perfect, as at $A^4$; while, when the plates are perforated at the apexes of the undulations, as they may be when desired, and the felt so arranged as to be acted on by water when required, the excess of heat will be taken off and proper ventilation secured. The same plan may be adopted for the walls, ceiling, floors, doors, windows, and fittings generally, and may be galvanized, painted, papered, or decorated and finished according to the purposes for which the buildings may be intended, while the grates and stoves may also be fitted up with the undulated plates of suitable material for the promotion of heating and ventilation. Walls for building may also be laid up of undulated and perforated brick, or blocks made of ordinary or fire-proof or water-proof material. Fig. 35 illustrates bars and plates undulated and riveted so as to secure the whole strength of the metal, and to prevent shearing of the rivets. Its superiority appears plain when contrasted with Fig. 36, representing plain bars held together by the rivets only. Fig. 37 shows the same advantage as to riveting when the bars or plates are only undulated near their junction. A contrast to this form may be seen in Fig. 38. Fig. 39. In this figure is illustrated a combination of the undulated metals with wood and other material. Its superiority is seen by comparison with the plain form represented in Fig. 40. Fig. 41, method of forming armor-plated blocks of the undulated and compressed forms of metals and wood, end on, with smooth anvil-face on the outside, to be built in, where desired, and fixed without bolting, with the armor-plating made wholly of metals, by which the weight may be reduced to any required extent in the less exposed parts, and yet the whole correspond on the outside. Fig. 42, manner of building fortifications or other works, with the undulated and compressed metal blocks on the outside, and the inside formed of wood, brick, earth, or other suitable material. Faces of dwellings may be similarly formed of artificial stone and filled in with brick or concrete, leaving proper openings for flues to be used for various purposes, such as heating and ventilation. Fig. 43, similar blocks or bricks with smooth sides and ends, the tops and bottoms being finished with sunk undulations, and perforated, when required. Fig. 44, similar blocks or brick, with undulated tops and bottoms, to interlock and bond into each other. In all cases other portions may be undulated or made plain, as circumstances may require. Fig. 45 shows a section for building up turrets, shields, cylinders, shafts, domes, and other purposes of like character. These may be made portable. The undulations interlocking, but few bolts will be required to secure requisite stability. Fig. 46 represents an end view of a block built up of metals of various qualities intermixed, and bonded together by the interlocking of the undulations, or bolted or welded. Fig. 47 represents a block composed, in part, of wood, interlocked and combined with the iron, as indicated.

I am aware that single corrugated surfaces have heretofore been given to metals and other materials to increase their strength, and that I have myself invented and secured, in England, the right to undulate with double corrugations metals and materials manufactured in the ordinary way, as well as for using the same for ventilation; but What I now claim as my invention is—

1. The double or compound corrugated or undulated form of plates or sheets of iron, glass, or other moldable material used in building, for railroads, civil, military, and naval purposes, substantially as described and set forth.

2. I claim the combination of several undulated plates thus formed of malleable metal into one plate or block of greater thickness, by piling several plates onto each other crosswise, so that the longitudinal undulations of each plate and its fibers, when composed of fibrous material, shall alternately pack, cross, and lock into the transverse undulations of the adjoining plates; then putting the fagot thus formed through the heating, welding, rolling, forging, and compressing processes, as described, and for the purposes set forth.

In witness whereof I have hereunto set my hand.

Witnesses:     WILLIAM HAGGETT.
  M. WYNN,
  DANL. FORSHAW.